a method of fast gridding of irregular data, has been developed for spatial interpolation of large irregular spatial point data sets; for example building a 3D geographic terrain grid surface from billions of irregularly spaced xyz coordinates on the earth's surface. The method developed typically translates into many orders of magnitude gain in computational speed. For example, to produce a gridded data set (having M rows and N columns) from P irregularly located sampling points, the computational steps required can be reduced from a number of the order of O(M×N×P) to a lesser number of the order of O(M×N+P) operations. The method achieves this by ensuring that each of the P sampling points is visited only once. This is particularly significant since spatial data collection devices typically collect data points in the billions. The method described is readily extendible to any number of dimensions.

14 Claims, 1 Drawing Sheet

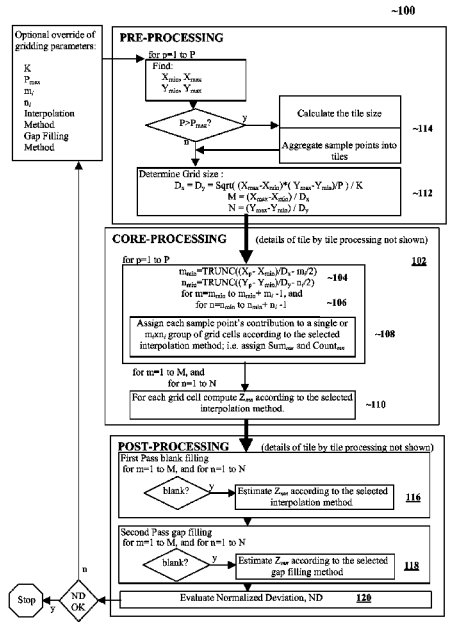

FAST GRIDDING OF IRREGULAR DATA

CROSS REFERENCE TO RELATED APPLICATIONS

This non provisional application relates to a Provisional Application:

Title: Fast Gridding of Irregular Data

U.S. Application No. 60/767,191

EFS ID: 104877

Filing Date: 9 Mar. 2006 the entirety of which is incorporated herein by reference.

BACKGROUND OF THE INVENTION

Introduction

The gradual accumulation of spatial data in all fields of science as well as the increasing capacity of data acquisition equipment, such as LIDAR (Light Distancing And Ranging) for airborne topographic mapping, is giving rise to an exponentially growing volume of information. This growth exceeds Moore's law doubling computation capacity every 18 months. The common approach, when carrying out analyses on computing platforms, is to throw more computational resources at the problem. This approach is reaching its scalability limit and, once again, the development of smart and efficient algorithms is becoming paramount for practical processing gargantuan data sets.

Spatial analysis based on regular rectangular grids is one method of improving the efficiency of data processing and modeling. The regular grid affords innumerable advantages in statistical analysis, frequency domain analysis, linear or non-linear modeling and so on. In addition, the regularity of rectangular grids allows the use of hardware assisted vector processing techniques which further leverage Moore's law.

Problem Statement

Most collected data is sampled in irregular or semi regular patterns; therefore an important step in data processing is the marshalling of data into a uniform spatial grid. This is done by generating a grid G of M by N cells from P distributed sampling points characterized by their value $Z_p$, and their coordinates $X_p$ and $Y_p$. The prototypical gridding method uses the Inverse Distance Weighing (IDW) method to interpolate a value at each grid point involving the following computation for each grid cell $G_{n,m}$:

$$G_{n,m} = \sum_{p=1}^{P} V_p \bigg/ \sqrt{(X_p - m\Delta x)^2 + (Y_p - n\Delta y)^2} \bigg/$$

$$\sum_{p=1}^{P} 1 \bigg/ \sqrt{(X_p - m\Delta x)^2 + (Y_p - n\Delta y)^2}$$

This requires P compound operations for each of M×N cells for a total of M×N×P compound operations. Other techniques, such as krigging, triangulated irregular network (TIN) and spline interpolation, also involve the sequential revisiting of each of the P sampling points for each of the M×N grid points.

If the grid is to approximate the spatial resolution of the original data set one would expect the number of grid points M×N to be proportionate to the number of sampling points P. This yields that processing power needed from gridding a data set grows with $P^2$. Clearly such brute force gridding techniques become untenable with very large data sets.

Two factors affect the scalability of large data set analysis: processing power (i.e. number of operations required) and memory usage (i.e. number and size of storage units). Often one of these features is normally compromised to optimize the other. A modest geographic data set by today's standard might be a digital terrain model of an urban area having point samples at an average resolution of In over an area of 10 km×10 km (100 km2). This is 100,000,000 data points with an X, Y and Z value which if represented in double precision translate to 2.3 Gb of information.

The popular LiDAR (Light Distancing and Ranging) technology now commonly delivers as many as 1 to 2 billion X, Y, Z coordinates in a single surveyed region. This represents 20 to 40 Gb of raw information. This will stress the memory capacity of many current computer systems especially if more fields are needed for the storage of intermediate results.

With processing requirements of the order of $O(P^2)$ and assuming only one operation per point, current hardware requires hundreds of hours of calculations. This clearly places interactive processing out of reach and reduces the feasibility of exploratory analysis, that is, performing what if scenarios to aid in decision making.

BRIEF SUMMARY OF THE INVENTION

A method of fast gridding of irregular data, has been developed for spatial interpolation of large irregular spatial point data sets; for example building a 3D geographic terrain grid surface from billions of irregularly spaced xyz coordinates on the earth's surface. The method developed typically translates into many orders of magnitude gain in computational speed. For example, to produce a gridded data set (having M rows and N columns) from P irregularly located sampling points, the computational steps required can be reduced from a number of the order of O(M×N×P) to a lesser number of the order of O(M×N+P) operations. The method achieves this by ensuring that each of the P sampling points is visited only once. This is particularly significant since spatial data collection devices typically collect data points in the billions. The method described is readily extendible to any number of dimensions.

DETAILED DESCRIPTION OF THE INVENTION

Single Pass Point Processing

Figure 1:
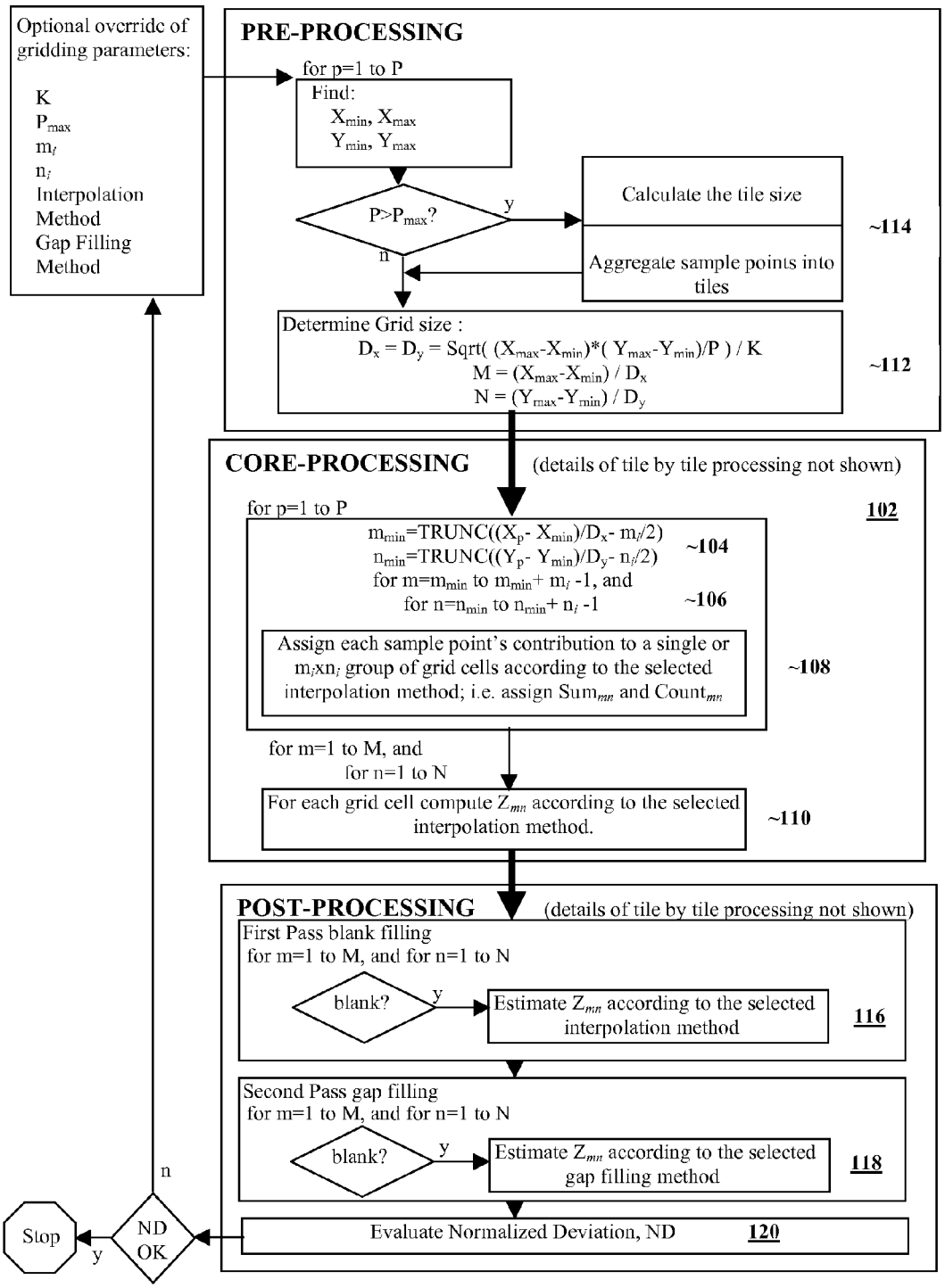
FIG. 1 is a schematic representation of an exemplary embodiment of a method for fast gridding of irregular data.

In an exemplary embodiment of a fast gridding method 100, when building a surface grid (having M rows and N columns) from P irregularly located sampling points, the fast gridding method 100 reduces the processing power required for data gridding to the order of O(P). This is accomplished through an algorithm where each individual point, p, is visited only once 102. For each such point, corresponding grid indices are easily computed by taking the modulus of the point coordinates 104. This essentially reverses the traditional processing order and takes immediate advantage of the regularity of the grid. Instead of scanning each grid point and then searching though all the samples to find a match, all the data points are scanned and, through simple arithmetic, the indices of the corresponding grid points are found.

In many instances, several sampling points may be matched to the same grid index and some means of estimating a value at the grid point from multiple nearby samples is necessary. To accomplish this, two arrays are formed, that are initialized to zero, and for each sample point the following is assigned 108: $SUM_{m,n}$, where the contribution of each sample assigned to (m, n) is cumulated; $COUNT_{m,n}$, which is incremented each time the a sample is assigned to (m, n).

Once all P sampling points are processed, the grid can be scanned once to calculate the grid value $Z_{m,n}$ for each grid cell 110. The estimation of $Z_{m,n}$ is an $O(M \times N)$ process using standard techniques such as averaging:

$$Z_{m,n} = SUM_{m,n}/COUNT_{m,n}$$

With appropriately selected M and N the resulting grid will have a spatial resolution comparable to the original data but since the coordinates $X_{m,n}$ and $Y_{m,n}$ do not need to be stored explicitly, the storage requirements are reduced by 66%. Note that the value of Z can be stored at the same location as SUM, so that COUNT, which in most cases is a single byte array, is the only temporary storage required.

The method 100, where for each sample point a single grid location (m, n) is computed, is likely to leave unassigned values of $Z_{m,n}$, the filling of which will be discussed later.

An alternative exemplary embodiment of the method 100 extends further by allowing the assignment of one sample point to several grid points distributed in $m_i \times n_i$ patterns about the sample point, where $m_i \times n_i$ defines a small region of influence or footprint for each sample point 106. The number of operations required by the fast gridding method 100 is then proportional to $P \times m_i \times n_i$, however, $m_i \times n_i$ is for all practical purposes fixed or selected independently of the number of sampling points, thus computational load remains O(P). The case of assigning each sample point to $m_i \times n_i$ grid points will result in a smoothed field, equivalent to having passed the gridded data through an $m_i, n_i$ moving-average filter. Spatial details will be lost, but the number of unassigned blank spots will have been reduced.

In another alternative exemplary embodiment of the method 100, the resolution of the grid can be augmented a priori to $m_i \times M$ by $n_i \times N$, each sample point assigned a foot print of $m_i \times n_i$ and finally the high resolution grid can be decimated back to M×N by simple averaging. At the cost of more temporary memory usage, the result retains the initial spatial resolution but still provides some gap filling ability.

Interpolation

In an alternative exemplary embodiment of the method 100, other more advanced estimation techniques for $Z_{m,n}$ can be incorporated based on the interpolation of surrounding values using standard interpolation techniques. The following shows how classical interpolation techniques can be integrated at this stage 110 into the method 100 in such a way that that the requirement for only one pass is still satisfied. Examples include:

Inverse Distance Weighting (IDW), which has the advantage that any sample point very close to a grid point will have much more influence on its value, thus greatly reducing the footprint smoothing effect but retaining the gap filling ability. The resulting grid is very close to what would be obtained by the traditionally applied IDW technique. The IDW calculation is adapted as follows:

$WSUM_{m,n}$, cumulates $Z_p/D_{p,m,n}$ for each sample assigned to (n, m);

$WCOUNT_{m,n}$, cumulates $1/D_{p,m,n}$ for each sample assigned to (n, m), $D_{p,m,n}$ is the distance between the sampling point p and the grid point (n, m).

Final estimates of the gridded values: $Z_{m,n} = WSUM_{m,n}/WCOUNT_{m,n}$

For most practical cases the IDW technique is recommended with $(m_i, n_i) = (3, 3)$.

Closest estimate, in which case only the point closest to the grid point is retained in order to assign a value to that grid point. This results in no smoothing and forces each grid value to agree exactly with the nearest sample. This technique is the fastest but, in regions of dense sampling, it is more prone to aliasing high frequency signals into the grid. Generally the resulting grid will contain more high frequency energy than with other techniques. The Closest estimate calculation for each sample point, p, requires two arrays:

$Z_{m,n}$ is assigned $Z_p$ if $D_{p,m,n} < MIN_{m,n}$ for each sample assigned to (n, m);

$MIN_{m,n}$ is assigned $D_{p,m,n}$ if $D_{p,m,n} < MIN_{m,n}$, where: $D_{p,m,n}$ is as before, $MIN_{m,n}$ must be initialized to some large value $> \sqrt{(m_i \Delta x)^2 + (n_i \Delta y)^2}$ After scanning all the sampling points, Z is obtained directly.

Minimum or Maximum estimates are especially useful when extremes of the sampling points are most relevant. This occurs in hydrography, for example, where navigation maps must portray the shallowest depth of water available in an area to assure that ships do not run aground. This technique purposefully produces a biased estimate Z, is very fast and is memory efficient. For each sample point, p, the following simple assignment is:

if $Z_p < Z_{m,n}$ and a Minimum estimate is required then $Z_{m,n}$ is assigned $Z_p$ if $Z_p > Z_{m,n}$ and a Maximum estimate is required then $Z_{m,n}$ is assigned $Z_p$ ($Z_{m,n}$ must be initialized to some very large or very small value, as appropriate)

Pre-Processing

The objective of the fast gridding method 100 is to produce a gridded data set preserving as much as possible the information richness of the original irregular sample data set. The following problems which arise from this objective can be solved in the pre-processing stage:

1. an appropriate resolution for the grid must be chosen;
2. points may need to be aggregated into portions small enough to be processed.

Choosing an Appropriate Grid Resolution

At the time of sample data aggregation, the data must be scanned to obtain minimum and maximum X and Y coordinates which define a bounding rectangle for the grid. If the sampling points can be assumed to be uniformly distributed, a grid with the same number of cells as the number of sampling points should preserve the essential spatial features of the data.

Thus the resolution can be derived 112 from:

$$D_x = D_y = \mathrm{Sqrt}(((Max(X_p) - Min(X_p))*(Max(Y_p) - Min(Y_p)))/P)/K$$

And the grid dimensions can be set 112 as:

$$M = (Max(X_p) - Min(X_p))/D_x$$

$$N = (Max(Y_p) - Min(Y_p))/D_y$$

By default K=1, but if the data set is particularly clumpy it then K should be set to a larger value to obtain a finer resolution. Conversely a coarser resolution grid is obtained by setting K to a value between 0 and 1.

Point Aggregation

Although the described gridding method 100 is relatively memory efficient there are some data sets that are so large (i.e. $P>P_{max}$) that it is not practical to keep the entire sampling data set or the complete grid in memory at once (because doing so can result in so much virtual memory page swapping as to completely degrade performance). In an exemplary embodiment of the method 100, where the number of points is exceedingly large, the fast gridding method 100 pre-aggregates sample points into coarse tiles 114. This aggregation is very fast and requires O(P) operations to simply assign the samples to a rectangular sub-domain. Often the input data is already organized in such fashion either exactly or approximately.

After performing point aggregation, gridding can take place tile by tile. In the case where the region of influence is greater than one cell, i.e. ($m_i$, $n_i$) is not equal to (1,1), up to nine tiles of the gridded data set must be kept in memory at once to ensure seamless transition across tile boundaries. This still greatly reduces the amount of memory required, and relieves scalability issues with respect to the size of the sampling data sets.

To achieve further memory economy, the fast gridding method 100 can store real variables in the form of more compact integers with fixed point representation. The calculations described above are performed with floating point arithmetic but the result can be stored in fixed point representation. As gridding progresses through the tiled data set, any tile which is completed is immediately converted to fixed point representation and transcribed to permanent storage. Thus at most nine tiles need to kept in floating point representation at any one time.

Post-Processing

The nature of irregular data usually results in gaps in the surface grid that is generated. Efficiencies in filling these gaps are automatically accommodated by the fast gridding method 100.
1. Small gaps in the grid resulting from regions of low sampling density are filled 116;
2. Larger gaps in the grid can be filled where no data points exist 118;
3. Finally, the accuracy of the resulting gridded surface in reproducing the sample data surface must be assessed by calculating the normalized deviation 120.

Gap Filling

The fast gridding method 100 optionally processes gaps in two passes:

In the first pass, any empty grid cell is assigned a value equal to the average of $m_j \times n_j$ non-empty surrounding cells. This will fill small holes 116 with interpolated, smoothed values and in cases where the sample data points are relatively uniformly distributed will result in a complete grid. In other cases large empty areas may remain.

In the second pass larger gaps can be filled in one of several ways 118:
1. assign an arbitrary distinctive value to unassigned regions as an indication that no data is present;
2. compute the average value of the cells bounding the unassigned region and assign this value to the empty cells, this is appropriate for example to represent lakes;
3. use the IDW technique, or other interpolation techniques, to interpolate the interior field from the values of cells bounding the unassigned region, this produces a smooth surface that will not over or undershoot the bounding region.

Beyond these automatic gap filling techniques, other modeling techniques can be used to fill larger gaps in the post processing phase.

CONCLUSION

The ability of the fast gridding method 100 to efficiently produce regular gridded data sets from irregularly distributed sampling points has been described. The method 100 imposes an O(P) computational load which is a vast improvement over more conventional methods and affords orders of magnitude improvement in speed.

Although the method 100 has been described in the context of 2D geographical data, it is equally applicable in 3D such as for medical imaging or in N dimensional problems such as may be encountered in various domains of science. Similarly, the dependent variable Z can be a real number scalar, an integer, a vector or any other combination of attributes.

The efficient and scalable gridding of irregular data is but one step in the larger library of algorithms available for the modeling and analysis of huge regular data sets.

What is claimed is:

1. A computer implemented method for producing a gridded data set, having M rows by N columns of grid, from a number of irregularly located P sampling points in a very large data set used for modeling and analysis of spatial data and stored in computer memory, the method comprising:
    computing for each sampling point P, corresponding grid indices in an M by N grid pattern by taking a modulus of coordinates associated with each sampling point;
    matching each of the P sampling points to a small rectangular pattern of $m_i$ rows by $n_i$ columns, where $m_i$ and $n_i$ define a small region of influence, selected independently of the number of sampling points, distributed around each sample point P;
    accumulating grid index values in a first M row by N column computer memory storage array for each P sampling point;
    incrementing counters in a second M row by N column computer memory storage array where multiple P sampling points are matched to the same grid index;
    scanning the grid a single time, once all P sampling points have been processed, and calculating, for each grid index, a grid value based on the interpolation of the grid index values; and
    storing the calculated grid value of the first array to the computer memory storage.

2. The method of claim 1, wherein prior to computing, the method further comprising pre-processing the sampling points, wherein the sampling points are aggregated by assigning samples to a rectangular sub-domain of coarse tiles which then undergo the gridding computation tile by tile.

3. The method of claim 1, further comprising post processing the calculated grid values by further calculating, for each grid index which has not been assigned a grid value, an interpolated grid value, based on the grid value of those of its immediately neighboring grid indices which have already been assigned a grid value.

4. The method of claim 1 further comprising post processing the calculated grid values by further calculating, for each region of adjacent grid indices which have not been assigned a grid value, an interpolated grid value, based on the grid values of the perimeter grid indices bounding each such region.

5. The methods of claim 1 wherein the gridded data set has three or more dimensions; wherein the three dimensional gridded data set has rows, columns and layers of grid indices which comprises a computer memory storage array; wherein the method of claim 1 is performed for each layer.

6. The methods of claim 1 wherein each grid index in the gridded data set has two or more associated grid values.

7. The method of claim 1 wherein interpolating the calculated grid values is performed by averaging the grid values wherein each value in the first array is divided by the corresponding value in the second array.

8. The method of claim 1 wherein interpolating the calculated grid values is performed by an inverse distance weighting of values in the first array and second array to calculate the grid value based on surrounding calculated grid values.

9. The method of claim 1 wherein interpolating the calculated grid values is performed by determining a closest grid value to the sampling point P grid point to assign a grid value to the grid point.

10. The method of claim 1 wherein interpolating the calculated grid values is performed by determining maximum or minimum estimates to calculate the grid value where extremes of the sampling points are most relevant to a type of the data set.

11. The method of claim 3 wherein the interpolated grid value determined during post processing is interpolated by one of:
    assigning an arbitrary distinctive grid value to unassigned grid indices as an indication that there is not data present;
    computing an average grid value of cells bounding each unassigned grid index and assigning this grid value to empty cells; and
    filling holes in the gridded data set by performing an inverse distance weighting to interpolate the interior field from the grid values of cells bounding the hole.

12. The method of claim 4 wherein the interpolated value determined during post processing is interpolated by one of:
    averaging surrounding grid values;
    assigning an arbitrary distinctive value to unassigned regions as an indication that there is not data present;
    computing an average grid value of cells bounding each unassigned region and assigning this grid value to empty cells; and
    filling holes in the gridded data set by performing an inverse distance weighting to interpolate the interior field from the grid values of cells bounding the hole.

13. The method of claim 1 wherein the values stored in the first and second arrays are stored in the form of compact integers with fixed point representations.

14. The method of claim 1 wherein storing the calculated grid values to memory comprises storing the calculated grid values in the first array and the second array is deleted.

* * * * *